United States Patent [19]

Welles et al.

[11] Patent Number: 4,750,038
[45] Date of Patent: Jun. 7, 1988

[54] TELEVISION PICTURE DISPLAY DEVICE

[75] Inventors: Petrus W. G. Welles; Dionysius A. Boerrigter; Hendrik Van Der Wal; Pieter J. Zijlstra, all of Eindhoven, Netherlands

[73] Assignee: U.S. Philips Corporation, New York, N.Y.

[21] Appl. No.: 54,550

[22] Filed: May 27, 1987

[30] Foreign Application Priority Data

Jun. 10, 1986 [NL] Netherlands .......................... 8601500

[51] Int. Cl.⁴ .............................................. H04N 5/45
[52] U.S. Cl. .................................................. 358/183
[58] Field of Search .................. 358/183, 181, 22, 160

[56] References Cited

U.S. PATENT DOCUMENTS 4,636,864 1/1987 Annegarn ............................ 358/183
4,707,742 11/1987 Field ................................... 358/183

Primary Examiner—Tommy P. Chin
Attorney, Agent, or Firm—Gregory P. Gadson

[57] ABSTRACT

In a television picture display device which can display a compressed (by 13) sub-picture of a second video signal source (29) in a main picture of a first video signal source (1), a correct mutual location of the picture information in the sub-picture with respect to the main picture is always obtained by means of a first (55) and a second (119) even-odd field identification circuit for the sub-picture and for the main picture, respectively, an interlacing circuit (71) and an interlacing-correction circuit (125), so that troublesome phenomena no longer occur in the sub-picture upon field transitions.

16 Claims, 2 Drawing Sheets

TELEVISION PICTURE DISPLAY DEVICE

BACKGROUND OF THE INVENTION

The invention relates to a television picture display device comprising a picture display tube having a scanning circuit which can be synchronized by a first horizontal synchronizing signal and a first vertical synchronizing signal from a first video signal source for obtaining a main picture display of a first video signal obtained from the first video signal source, and a subpicture change-over switch which can be operated by a switching signal for alternately applying the first video signal or a sub-picture signal to the picture display tube, said sub-picture signal being obtained by means of a compression circuit from a second video signal supplied by a second video signal source, the compression circuit comprising a field memory having a write and a read circuit, which write circuit can be synchronized by a second vertical synchronizing signal obtained from the second video signal source and by a second horizontal synchronizing signal divided in frequency by a divider circuit.

A television picture display device of the type described above is known for example from IEEE Transactions on Consumer Electronics, February 1979, pages 512–519.

Since the video signal sources are generally not synchronized, the information of the sub-picture displayed during one and the same field of the main picture mostly originates partly from the actual field and partly from the previous field of the second video signal source. This causes disturbing phenomena such as, for example, fringes on oblique picture elements.

SUMMARY OF THE INVENTION

It is an object of the invention to mitigate these disturbing phenomena.

According to the invention a television picture display device of the type described in the opening paragraph is therefore characterized in that the divider circuit forms part of an interlacing circuit an operating signal input of which is coupled to an output of a first even-odd field identification circuit, which output is also coupled to an input of the field memory for transferring even-odd field information at least once per line period from the second video signal source via the field memory to an input of an interlacing-correction circuit coupled to an output of the field memory, a further input of said circuit being coupled to an output of a second even-odd field identification circuit which can be controlled by the first horizontal and the first vertical synchronizing signal and which has an output coupled to an input of the read circuit of the field memory for obtaining a read address correction dependent on the output signals from the even-odd field identification circuits so that interlacing of the sub-picture is maintained.

Due to the measures according to the invention it can be established by means of the transferred even-odd field information whether the portion of the sub-picture to be displayed is associated with a field which is located in a high position or with a field in a low position and the interlacing correction circuit can accordingly perform a position correction in the displayed sub-picture so that the disturbing phenomena is removed.

The invention will now be described with reference to the drawings.

DETAILED DESCRIPTION OF THE INVENTION

Figure 1:
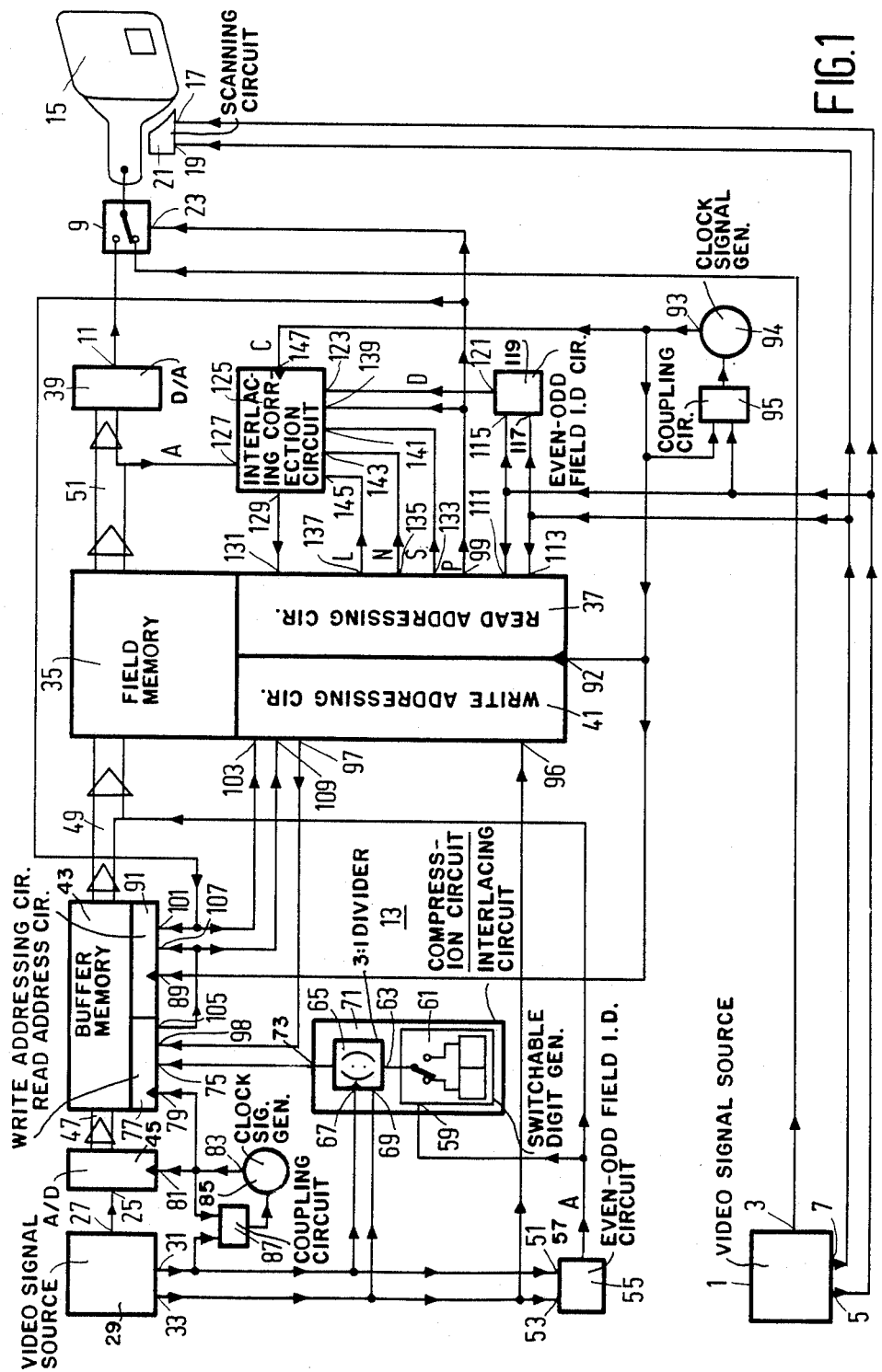
FIG. 1 illustrates by way of a block diagram a television picture display device according to the invention.

In FIG. 1 a first video signal source 1 supplies a first video signal from an output 3, a first horizontal synchronizing signal from an output 5 and a first vertical synchronizing signal from an output 7. The first video signal source 1 may be, for example, a receiver section of a television receiver, a television camera or a video recorder.

The first video signal is applied from the output 3 of the first video signal source 1 to an input of a sub-picture change-over switch 9 which receives at another input a sub-picture signal obtained from an output 11 of a compression circuit 13. An output of the sub-picture changeover switch 9 applies a video signal to be displayed to a picture display tube 15.

For the sake of clarity FIG. 1 shows the relevant signal paths in a single form. It will be evident that multiple signal paths are used in a colour television picture display device.

The first horizontal synchronizing signal and the first vertical synchronizing signal are applied from the outputs 5 and 7 of the first video signal source 1 to inputs 17 and 19, respectively, of a scanning circuit 21 which, together with the first video signal provides for a main picture display on the picture display tube 15.

For the display of a sub-picture the sub-picture change-over switch 9 is periodically switched to the state not shown during a part of each field period of the main picture by a switching signal applied to an operating signal input 23 of the sub-picture change-over switch 9.

The compression circuit 13 has an input 25 which receives a second video signal from an output 27 of a second video signal source 29. The second video signal source 29 also applies a second horizontal synchronizing signal to an output 31 and a second vertical synchronizing signal to an output 33. The second video signal source 29 may be, for example, a second receiver section of a television receiver, a television camera or a video recorder.

The compression circuit 13 comprises a field memory 35 having a read circuit constituted by a read addressing circuit 37 and a digital-to-analog converter 39 and a write circuit comprising a write addressing circuit 41, a line buffer memory 43 and an analog-to-digital converter 45. The input 25 and the output 11 of the compression circuit 13 is also the input of the analog-to-digital converter 45 and the output of the digital-to-analog converter 39, respectively. The analog-to-digital converter 45 applies via a signal path 47 a digitalized second video signal to the line buffer memory 43 which supplies a digital second video signal via a signal path 49 to the field memory 35, which video signal is suitable to be written into this memory. The field memory 35 then applies a compressed digital second video signal via a signal path 51 to the digital-to-analog converter 39 which forms the sub-picture signal therefrom and supplies this signal from its output 11.

The outputs 31 and 33 of the second video signal source 29 are connected to inputs 51 and 53, respectively, of a first even-odd field identification circuit 55 an output 57 of which supplies even-odd field information in the form of a logic one or a logic zero signal dependent on the fact whether the second video signal at the output 27 of the second video signal source 29 originates from an even or an odd field. This even-odd field information is applied via the signal path 49 to the field memory 35 and continuously written thereon. An even field is herein to be understood to mean the picture field located in a high position and an odd field is to be understood to mean the picture field located in a low position of a frame. These fields will hereinafter also be referred to as first and second fields, respectively. The even-odd field identification circuit may be formed, for example, in known manner or it may be of a type as described in Netherlands Patent Application No. 8601062.

The output 57 of the first even-odd field identification circuit 55 is also connected to an operating signal input 59 of a switchable digit generator 61 supplying the digit one during one field and the digit two during the other field to a count-write input 63 of a three-to-one divider 65 which is formed as a counter and a counting signal input 67 of which is connected to the output 31 for the second horizontal synchronizing signal, whilst a write command signal input 69 is connected to the output 33 for the second vertical synchronizing signal from the second video signal source 29. The digit generator 61 and the three-to-one divider 65 constitute an interlacing circuit 71 whose output 73 connected to an output of the three-to-one divider 65 supplies a pulse to an input 75 of a write addressing circuit 77 of the line buffer memory 43 each time at the commencement of a line to be written into said line buffer memory.

Likewise, as a clock signal input 81 of the analog-to-digital converter 45, a write clock signal input 79 of the write addressing circuit 77 of the line buffer memory 43 is connected to an output 83 of a first clock signal generator 85 whose frequency is coupled to that of the second horizontal synchronizing signal by means of a coupling circuit 87.

Likewise as a clock signal input 92 of the field memory 35 and the write and read addressing circuits 41, 37 thereof, a read clock signal input 89 of a read address circuit 91 of the line buffer memory 43 is connected to an output 93 of a second clock signal generator 94 which, by means of a coupling circuit 95, is coupled in frequency to the first horizontal synchronizing signal originating from the output 5 of the first video signal source 1.

The active field period in which the field memory 35 is written via the line buffer memory 43 is derived by the write addressing circuit 41 of the field memory 35 from the second vertical synchronizing signal applied to an input 96 thereof and originating from the output 33 of the second video signal source 29. A signal representing this active field period is applied by an output 97 of the write addressing circuit 41 of the field memory 35 to an input 98 of the write addressing circuit 77 of the line buffer memory 43.

When the sub-picture is displayed the field memory 35 is not written from the line buffer memory 43. To this end, the switching signal, which is applied to the input 23 of the sub-picture change-over switch 9 and which originates from an output 99 of the read address circuit 37 of the field memory 35 and which will hereinafter be denoted by P, is also applied to an interruption signal input 101 of the read address circuit 91 of the line buffer memory 43 and to an interruption signal input 103 of the write addressing circuit 41 of the field memory 35.

The line buffer memory 43 is written each time during a line period of the second video signal source 29 whereafter there is time during two line periods to transfer its contents to the field memory 35 in the periods when there is no display from the field memory 35. Transferring is started immediately after writing. To this end a signal is applied from an output 105 of the write addressing circuit 77 of the line buffer memory 43 to an input 107 of the read address circuit 91 of the line buffer memory 43 and to an input 109 of the write addressing circuit 41 of the field memory 35.

The even-odd field information, hereinafter also denoted by A, originating from the output 57 of the first even-odd field identification circuit 55 is also applied to the signal path 49 leading to the field memory 35 so that per sample of the signal written into the field memory 35 a bit is present which indicates whether the relevant sample originates from an even or from an odd field of the second video signal source 29. When the writing of the field memory 35 is organized in such a manner that it cannot be interrupted at an arbitrary instant of a line period of the second video signal source 29, as is indeed the case here, it is sufficient to write the even-odd field information each time at the commencement of a line period.

For the purpose of reading the field memory 35 the read address circuit 37 thereof is synchronized with the scanning circuit 21 of the picture display tube 15 via inputs 111 and 113 connected to the outputs 5 and 7, respectively, of the first video signal source 1 so that the sub-picture is displayed in a desired position in the main picture.

The outputs 5 and 7 of the first video signal source 1 also apply the first horizontal synchronizing signal and the first vertical synchronizing signal to inputs 115 and 117, respectively, of a second even-odd field identification circuit 119, from which synchronizing signals an even-odd field information D of the main picture is derived which is applied via an output 121 of the second even-odd field identification circuit 119 to an input 123 of an interlacing-correction circuit 125 a further input 127 of which receives the even-odd field information A of the sub-picture from the signal path 51 during reading of the field memory 35.

The interlacing-correction circuit 125 applies a pulse via an output 129 thereof to an input 131 of the read addressing circuit 37 of the field memory 35 at given instants which will be further described hereinafter, which pulse causes an address counter of this read address circuit 37 to make an extra step. This is the simplest manner of read address correction. It is of course alternatively possible to perform both positive and negative read address corrections. This is, however, generally difficult to perform because there are generally no connections on the address circuit available for this purpose. The said pulse is derived from the signals A and D by means of a number of signals P, S, N, L which are obtained from outputs 99, 133, 135, 137, respectively, of the read address circuit 37 of the field memory 35 and which are applied to inputs 139, 141, 143, 145, respectively, of the interlacing-correction circuit 125. A clock signal input 147 of the interlacing-correction circuit 125 receives the second clock signal C from the output 93 of the second clock signal generator 94.

Figure 2:
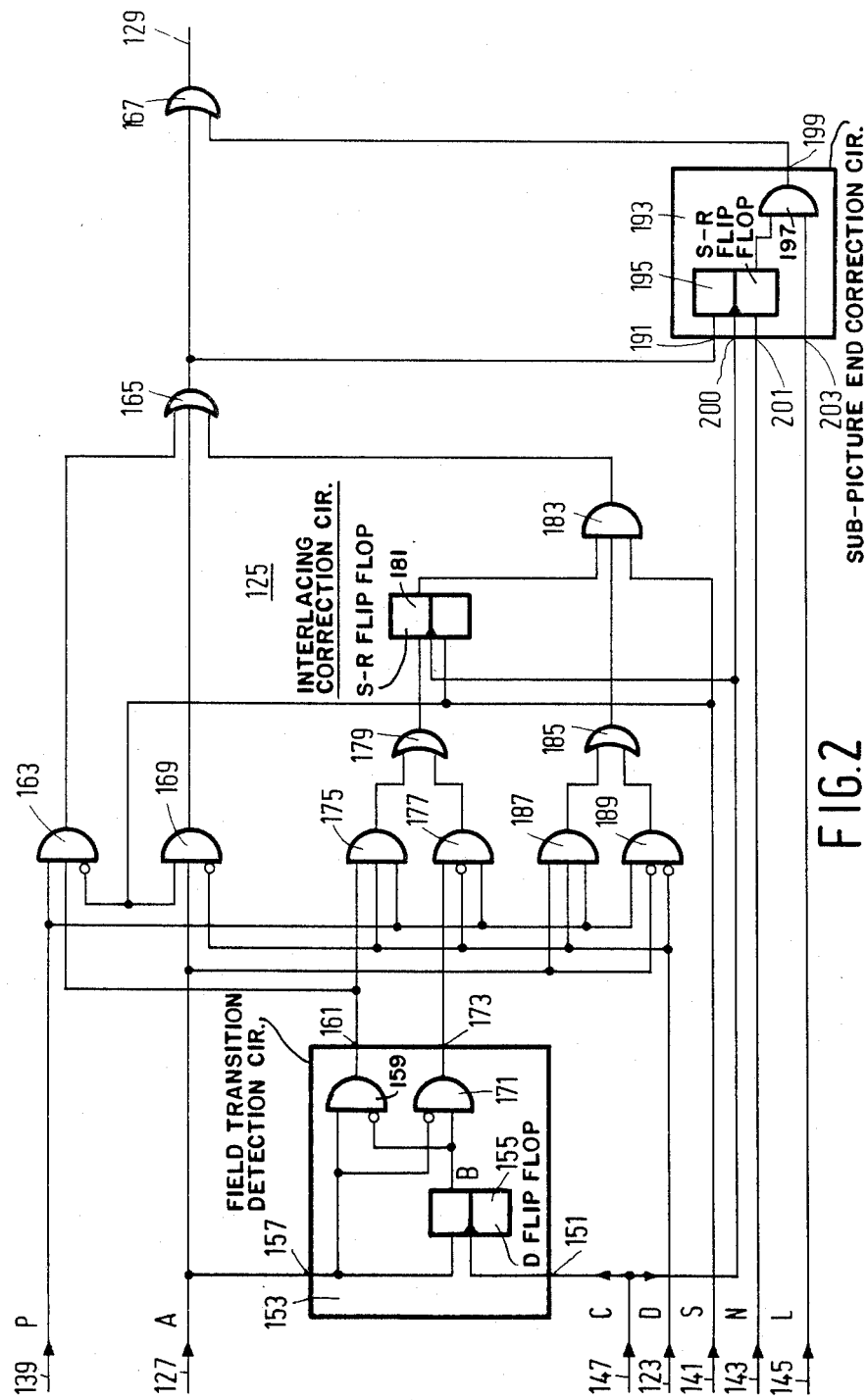
FIG. 2 illustrates by way of a principle circuit diagram a favorable embodiment of an interlacing-correction circuit for a television picture display device according to the invention.

The function of the above-mentioned signals and a favorable embodiment of an interlacing-correction circuit suitable for supplying the above-mentioned pulses for an extra step of the read address circuit as defined above will be elaborated with reference to FIG. 2.

In FIG. 2 corresponding components have the same reference numerals as in FIG. 1 The clock signal input 147 of the interlacing-correction circuit 125 is connected to a clock signal input 151 of a field transition detection circuit 153 which is connected to the clock signal input of a D flip-flop 155 whose D input is connected via an input 157 of the field transition detection circuit 153 to the input 127 of the interlacing-correction circuit 125 for the even-odd field information A of the sub-picture. The Q output of the D flip-flop 155 applies a signal B to an inverting input of an AND gate 159 which is delayed by one clock signal pulse period with respect to the signal A. The other input of the AND gate 159 is connected to the input 157 of the field transition detection circuit 153, and the output of the AND gate 159 is connected to an output 161 of the field transition detection circuit 153. The AND gate 159 supplies a pulse AB' from the output 161, which pulse covers one clock signal period when there is an odd-even field transition. In this case it was assumed that an even field of the sub-picture corresponds to a value of the signal A which is logic one and that the even field of the sub-picture is originally located in a higher position than the odd field.

At an odd-even transition in the sub-picture the displayed even portion would acquire a lower position after the transition than the displayed odd portion before the transition. To prevent this, the signal at the output 161 of the field transition detection circuit 153 is applied to an AND gate 163 a further input of which receives the signal P from the input 139 and an inverting input is connected to the input 141 to which the signal S is applied. The signal S is high during a clock signal period at the commencement of the sub-picture, consequently during the first clock signal period of the signal P in a field of the main picture.

At an odd-even field transition, which occurs in the sub-picture after the first clock period thereof, the AND gate 163 supplies a pulse which is applied via an OR gate 165 and an OR gate 167 to the output 129 of the interlacing-correction circuit 125 so that the read address of the field memory undergoes an extra increase of one step and the portion of the sub-picture displayed after the odd-even transition is raised in position and is brought to the correct position with respect to the odd portion.

If the main picture field in which the sub-picture occurred with the odd-even transition was an even field, the next main picture field is odd and the sub-picture therein will have an even-odd transition. The upper even portion of the sub-picture is then positioned too low with respect to the odd field of the main picture and is raised in position by an extra step at the commencement of the sub-picture in response to an extra pulse supplied by an AND gate 169 connected to a further input of the OR gate 165, while a first input of said AND gate receives the signal S, a second input receives the signal A and a third inverting input receives the signal D, i.e. the even-odd field information of the main picture which is one when the relevant field of the main picture is even.

If the main picture field in which the sub-picture occurred with the odd-even transition was an odd field, the next main picture field is an even field in which an even-odd sub-picture transition takes place and in which the position need not be corrected because the upper portions of the fields have a correct location with respect to each other and because there is no change of position at the sub-picture field transition.

In principle the AND gates 163 and 169 and the field transition detection circuit 153 may suffice.

The further components of the interlacing-correction circuit of FIG. 2 are refinements which perform additional corrections in given cases.

To this end, the field transition detection circuit 153 includes an AND gate 171 an input of which receives the signal B from the Q output of the D flip-flop 155 and an inverting input is connected to the input 157 of the transition detection circuit 153. The output of the AND gate 171 is connected to an output 173 of the field transition detection circuit 153 and supplies a pulse during one clock signal period in the event of an even-odd field transition of the sub-picture.

The output 161 of the field transition detection circuit 153 is also connected to an input of an AND gate 175 a second input of which is connected to the input 123 and a third input of which is connected to the input 139 of the interlacing-correction circuit 125.

The output 173 of the field transition detection circuit 153 is connected to a first input of an AND gate 177 an inverting second input of which is connected to the input 123 and a third input of which is connected to te input 139 of the interlacing-correction circuit 125.

The outputs of the AND gates 175 and 177 are connected to the input of an OR gate 179 the output of which is connected to the set input of a set-reset flip-flop 181 the reset input of which receives the signal S from the input 141 of the interlacing-correction circuit 125 and the Q output of which is connected to an input of an AND gate 183 the output of which is connected to the third input of the OR gate 165. The clock signal input of the set-reset flip-flop 181 is connected to the clock signal input 147 of the interlacing-correction circuit 125.

A second input of the AND gate 183 is connected to the output of an OR gate 185 and a third input is connected to the input 141 of the interlacing-correction circuit 125.

The inputs of the OR-gate 185 are connected to the outputs of two AND-gates 187, 189. The inputs of the AND-gate 187 receive the signals A, D and P from the inputs 127, 123, 139, respectively, of the interlacing-correction circuit 125. An input of the AND gate 189 is connected to the input 139 of the interlacing-correction circuit 125 for the signal P and its two inverting inputs are connected to the input 127 for the signal A and to the input 123 for the signal D of the interlacing-correction circuit 125.

The set-reset flipflop 181 is reset by the clock signal each time at the trailing edge of the signal S so that this flipflop 181 can only apply a logic one signal to the AND gate 183 until the end of the signal S when in the previous field of the main picture the OR gate 179 had supplied a logic one signal during the main picture. This is due to the operation of the AND gate 175 when the main picture field was even and when an odd-even field transition had occurred in the sub-picture, or due to the operation of the AND gate 177 when the main picture was odd and when an even-odd field transition had occurred in the sub-picture. The AND gate 183 can then supply a logic one signal during the occurrence of the signal S at the commencement of a sub-picture if also the OR gate 185 supplies a logic one signal, which is the case when the main picture field and the sub-picture field are both even or both odd. This only occurs when the field transition of the subpicture is displaced to the commencement thereof and is located so close to the commencement thereof that no field transition occurs in the sub-picture during the next field. Due to this measure it is even possible to display in an undisturbed manner a sub-picture originating from a 60 Hz video signal source in a main picture of a 50 Hz video signal source, or conversely.

In one of the above-mentioned cases the OR gate 165 thus applies a logic one signal to the OR gate 167, which signal is also applied to an input 191 of a sub-picture end correction circuit 193 which is also the set input of a set-reset flipflop 195 whose $\overline{Q}$ output is connected to an input of an AND gate 197 whose output 199 is also the output of the sub-picture end correction circuit 193. A second input 200 of the sub-picture end correction circuit 193, which is also the clock signal input of the set-reset flipflop 195, receives the clock signal from the input 147 of the interlacing-correction circuit 125. A third input 201 of the sub-picture end correction circuit 193, which is also the reset input of the set-reset flipflop 195, receives the signal N from the input 143 of the interlacing-correction circuit 125. This signal N is a pulse which occurs in the clock signal period preceding the signal S, hence in the clock signal period prior to the commencement of the sub-picture so that the set-reset flipflop 195 is reset prior to the commencement of each sub-picture.

A fourth input 203 of the sub-picture end correction circuit 193 receives the signal L from the input 145 of the interlacing-correction circuit 125. This signal L is a pulse which occurs in the last clock signal period of the penultimate line of the sub-picture. If during the occurrence of the sub-picture there had been no set action of the set-reset flipflop 195 because the OR gate 165 had not supplied an address correction signal, the $\overline{Q}$ output of this set-reset flipflop 195 is still logic one and the AND gate 197 as yet applies a logic one signal to the output 199 of the sub-picture end correction circuit at the end of the penultimate line of the sub-picture, which logic one signal produces an address correction via the OR gate 167 so that the end of the sub-picture occurs in the same position in the main picture as in the cases when an address correction signal is supplied by the OR gate 165 so that troublesome jumping of the end of the sub-picture cannot occur.

When the number of lines of the sub-picture is a multiple of three, the interlacing circuit 71 can be formed in a simpler manner by writing only once per two fields a suitable value into the counter 65 via the count input 63.

It will be evident that if the first video signal of the main picture is also digital, the digital-to-analog converter 39 can be incorporated after the sub-picture change-over switch 39, if desired, if the first and the second video signal have the same digital structure.

The even-odd field identification circuits 55 and 119 may each form part, if desired, of for example a synchronizing signal pattern correction circuit as described in the previously mentioned Netherlands patent application No. 8601062, which circuits can then apply the relevant synchronizing signals to the inputs 67 and 69 of the interlacing circuit 71 and to the input 96 of the write addressing circuit 41 of the field memory 35 and to the inputs 111 and 113 of the read addressing circuit 37 of the field memory 35 and to the inputs 17 and 19 of the scanning circuit 21, respectively.

We claim:

1. A television picture display device comprising a picture display tube having a scanning circuit which can be synchronized by a first horizontal synchronizing signal and a first vertical synchronizing signal from a first video signal source for obtaining a main picture display of a first video signal obtained from the first video signal source, and a sub-picture change-over switch which can be operated by a switching signal for alternately applying the first video signal or a subpicture signal to the picture display tube, said subpicture signal being obtained by means of a compression circuit from a second video signal supplied by a second video signal source, the compression circuit comprising a field memory coupled between said second video signal source and said change-over switch having a write circuit and a read circuit, which write circuit can be synchronized by a second vertical synchronizing signal obtained from the second video signal source and by a second horizontal synchronizing signal obtained from said second video signal source and divided in frequency by a divider circuit, characterized in that the divider circuit forms part of an interlacing circuit, an operating signal input of which is coupled to an output of a first even-odd field identification circuit, which said output is also coupled to an input of the field memory for transferring even-odd field information at least once per line period from the second video signal source via the field memory to an input of an interlacing-correction circuit coupled to an output of the field memory, a further input of said interlacing correction circuit being coupled to an output of a second even-odd field identification circuit which can be controlled by the first horizontal synchronizing signal and the first vertical synchronizing signal and which has an output coupled to an input of the read circuit of the field memory for obtaining a read address correction dependent on the output signals from the even-odd field identification circuits so that interlacing of the sub-picture is maintained.

2. A television picture display device as claimed in claim 1, characterized in that the compression circuit includes a line buffer memory, a write clock signal input of which is coupled to an output of a first clock signal generator and a read clock signal input of which is coupled to an output of a second clock signal generator to which also a clock signal input of the field memory is coupled, while an end-write signal output of a write addressing circuit of the line buffer memory is coupled to a start-read signal input of a read address circuit of the line buffer memory, and in that the switching signal is also applied to an interruption signal input of the line buffer memory and the even-odd field information is written into the field memory per sample of the second video signal.

3. A television picture display device as claimed in claim 2, characterized in that the divider of the interlacing circuit is a three-to-one counter, a write command input of which is coupled to the output for the second vertical synchronizing signal of the second video signal source and a count write input of which is coupled to an output of a digit generator which can be switched by the output signal of the first even-odd field identification circuit, which generator supplies alternately the digit one during one field and the digit two during the other field, while the count signal input of the counter is coupled to the output for the second horizontal synchronizing signal of the second video signal source.

4. A television picture display device as claimed in claim 2, characterized in that the interlacing-correction circuit includes a field transition detection circuit, an input of which is coupled to the input for the first even-odd field information of the interlacing-correction circuit and a clock signal output of which is coupled to the input of the second clock signal generator, an output of said field transition detection circuit being coupled to a gate circuit which is also coupled to the field memory output for the first even-odd field information, to an input for supplying the switching signal for the sub-picture change-over switch, to an input for supplying the second even-odd field information, and to an input for a start signal indicating the commencement of each sub-picture, said gate circuit applying an extra pulse to an input of the read address circuit of the field memory for an extra step of a read address count if an unwanted exchange of position of the odd and even fields of the displayed sub-picture information tends to occur.

5. A television picture display device as claimed in claim 4, characterized in that the interlacing-correction circuit comprises a gate and memory circuit which upon the occurrence of given even-odd field information states of the sub-picture supplies an extra pulse in the previous field of the main picture at the commencement of the sub-picture in the actual field of the main picture if the main picture and the sub-picture are then both even or both odd.

6. A television picture display device as claimed in claim 5, characterized in that the interlacing-correction circuit includes a sub-picture end correction circuit for supplying a pulse at the end of the penultimate line of the sub-picture if no extra pulse had occurred at the output of the interlacing-correction circuit.

7. A television picture display device as claimed in claim 4, characterized in that the interlacing-correction circuit includes a sub-picture end correction circuit for supplying a pulse at the end of the penultimate line of the sub-picture if no extra pulse had occurred at the output of the interlacing-correction circuit.

8. A television picture display device as claimed in claim 1, characterized in that the divider of the interlacing circuit is a three-to-one counter, a write command input of which is coupled to the output for the second vertical synchronizing signal of the second video signal source and a count write input of which is coupled to an output of a digit generator which can be switched by the output signal of the first even-odd field identification circuit, which generator supplies alternately the digit one during one field and the digit two during the other field, while the count signal input of the counter is coupled to the output for the second horizontal synchronizing signal of the second video signal source.

9. A television picture display device as claimed in claim 8, characterized in that the interlacing-correction circuit includes a field transition detection circuit, an input of which is coupled to the input for the first even-odd field information of the interlacing-correction circuit and a clock signal output of which is coupled to the input of the second clock signal generator, an output of said field transition detection circuit being coupled to a gate circuit which is also coupled to the field memory output for the first even-odd field information, to an input for supplying the switching signal for the sub-picture change-over switch, to an input for supplying the second even-odd field information, and to an input for a start signal indicating the commencement of each sub-picture, said gate circuit applying an extra pulse to an input of the read address circuit of the field memory for an extra step of a read address count if an unwanted exchange of position of the odd and even fields of the displayed sub-picture information tends to occur.

10. A television picture display device as claimed in claim 9, characterized in that the interlacing-correction circuit comprises a gate and memory circuit which upon the occurrence of given even-odd field information states of the sub-picture supplies an extra pulse in the previous field of the main picture at the commencement of the sub-picture in the actual field of the main picture if the main picture and the sub-picture are then both even or both odd.

11. A television picture display device as claimed in claim 10, characterized in that the interlacing-correction circuit includes a sub-picture end correction circuit for supplying a pulse at the end of the penultimate line of the sub-picture if no extra pulse had occurred at the output of the interlacing-correction circuit.

12. A television picture display device as claimed in claim 9, characterized in that the interlacing-correction circuit includes a sub-picture end correction circuit for supplying a pulse at the end of the penultimate line of the sub-picture if no extra pulse had occurred at the output of the interlacing-correction circuit.

13. A television picture display device as claimed in claim 1, characterized in that the interlacing-correction circuit includes a field transition detection circuit, an input of which is coupled to the input for the first even-odd field information of the interlacing-correction circuit and a clock signal input of which is coupled to the output of the second clock signal generator, an output, of said field transition detection circuit being coupled to a gate circuit which is also coupled to the field memory output for the first even-odd field information, to an input for supplying the switching signal for the subpicture change-over switch, to an input for supplying the second even-odd field information (D), and to an input for a start signal indicating the commencement of each sub-picture, said gate circuit applying an extra pulse to an input of the read address circuit of the field memory for an extra step of a read address count if an unwanted exchange of position of the odd and even fields of the displayed sub-picture information tends to occur.

14. A television picture display device as claimed in claim 13, characterized in that the interlacing-correction circuit comprises a gate and memory circuit which upon the occurrence of given even-odd field information states of the sub-picture supplies an extra pulse in the previous field of the main picture at the commencement of the sub-picture in the actual field of the main picture if the main picture and the sub-picture are then both even or both odd.

15. A television picture display device as claimed in claim 14, characterized in that the interlacing-correction circuit includes a sub-picture end correction circuit for supplying a pulse at the end of the penultimate line of the sub-picture if no extra pulse had occurred at the output of the interlacing-correction circuit.

16. A television picture display device as claimed in claim 13, characterized in that the interlacingcorrection circuit includes a sub-picture end correction circuit for supplying a pulse at the end of the penultimate line of the sub-picture if no extra pulse had occurred at the output of the interlacing-correction circuit.

* * * * *

UNITED STATES PATENT AND TRADEMARK OFFICE
CERTIFICATE OF CORRECTION

PATENT NO. : 4,750,038
DATED : June 7, 1988
INVENTOR(S) : PETRUS W.G. WELLES ET AL It is certified that error appears in the above—identified patent and that said Letters Patent is hereby corrected as shown below:

IN THE CLAIMS

Claim 4, line 6     change "output" to --input--
                         change "input" to --output--

Claim 9, line 6     change "output" to --input--
                         change "input" to --output--

Signed and Sealed this

First Day of August, 1989

Attest:

DONALD J. QUIGG

Attesting Officer      Commissioner of Patents and Trademarks